US008121309B2

(12) United States Patent
Fischer et al.

(10) Patent No.: US 8,121,309 B2
(45) Date of Patent: Feb. 21, 2012

(54) ADAPTING A DIRECTIONAL MICROPHONE SIGNAL TO LONG-LASTING INFLUENCES

(75) Inventors: Eghart Fischer, Schwabach (DE); Jens Hain, Kleinsendelbach (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1149 days.

(21) Appl. No.: 11/542,497

(22) Filed: Oct. 3, 2006

(65) Prior Publication Data

US 2007/0076901 A1 Apr. 5, 2007

(30) Foreign Application Priority Data

Oct. 4, 2005 (DE) ........................ 10 2005 047 403

(51) Int. Cl.
*H04R 3/00* (2006.01)
*H04B 15/00* (2006.01)

(52) U.S. Cl. ........................................ 381/92; 381/94.7

(58) Field of Classification Search .................... 381/92, 381/94.2, 94.3, 94.7, 313, 317
See application file for complete search history.

(56) References Cited

U.S. PATENT DOCUMENTS

| | | | | |
|---|---|---|---|---|
| 4,536,887 | A * | 8/1985 | Kaneda et al. | 381/92 |
| 7,242,781 | B2 * | 7/2007 | Hou | 381/92 |
| 2001/0028718 | A1 | 10/2001 | Hou | |
| 2005/0025325 | A1 * | 2/2005 | Fischer | 381/313 |
| 2006/0013412 | A1 * | 1/2006 | Goldin | 381/92 |

FOREIGN PATENT DOCUMENTS

| | | | |
|---|---|---|---|
| DE | 198 44 748 | A1 | 10/1999 |
| DE | 101 95 945 | T1 | 3/2001 |
| EP | 1 191 817 | A1 | 3/2002 |

* cited by examiner

*Primary Examiner* — Ping Lee

(57) ABSTRACT

The directional effect of a static directional microphone is to be improved. In particular shadowing effects of the head for a hearing device worn on the head of the user are to be taken into account when adjusting at the directional microphone. To this end it is proposed that—like the adaptation of an adaptive directional microphone—the energy or power of the directional microphone signal emitted by the directional microphone is minimized, with the difference that in this case extremely long adaptation times are predetermined.

15 Claims, 6 Drawing Sheets

"eight"
Ti/Te=0

DI=4.7dB cardioid
Ti/Te=1

DI=4.8dB cardioid
Ti/Te=0.34

DI=6.0dB cardioid
Ti/Te=0.57

DI=5.7dB

ADAPTING A DIRECTIONAL MICROPHONE SIGNAL TO LONG-LASTING INFLUENCES

CROSS REFERENCE TO RELATED APPLICATIONS

This application claims priority of German application No. 10 2005 047 403.9 DE filed Oct. 4, 2005, which is incorporated by reference herein in its entirety.

FIELD OF INVENTION

The invention relates to a method of adjusting a directional microphone which, to create a directional characteristic, comprises at least two electrically interconnected microphones, whereby at least one microphone signal created by one of the microphones or a signal arising from this signal is delayed by a delay time which can be set within a specific range, whereby the power or the energy of a directional microphone signal created by the directional microphone is determined and whereby the power or energy of the directional microphone signal is minimized by adjusting the delay time. Furthermore the invention relates to a directional microphone for executing a method of this type and also to the use of such a directional microphone in a hearing device.

BACKGROUND OF THE INVENTION

Directional microphones are frequently used to accentuate a useful acoustic signal in an environment filled with interference noise. For example a speech signal is to be accentuated against the ambient noise in a hearing device with a directional microphone. In such cases directional microphones in hearing devices have for many years been among the established methods of reducing interference noise and have demonstrably led to improving the recognizability of speech in hearing situations in which the useful signal and the interference signals are entering the device from different directions in the room.

When a directional microphone is incorporated into the device, two different types are widely used:

a) Gradient Microphones:

These possess two sound entry points which lead to different sides of one and the same membrane of the gradient microphone. If sound arrives simultaneously at both sound entry points, the forces thus created on the membrane cancel each other out. The output signal in this case is equal to zero. The following general points apply: Sound which enters at right angles to the connecting line of the sound entry openings is extinguished. The disadvantage of gradient microphones is that they are barely able to be adjusted for interference sources which do not remain in a fixed location in relation to the microphones.

b) Electrically Connected Omnidirectional Microphones:

Omnidirectional microphones have one sound entry opening and ideally accept sound from all directions equally. A directional effect can be created by electrical connection of at least two omnidirectional microphones. To do this one directional microphone signal is delayed and subtracted from the microphone signal of a second omnidirectional microphone. Precisely as with the gradient microphone, with the microphone system just described, by a particular arrangement of the sound entry openings and adjusting the delay time a direction can be defined for which the incident sound from this direction is extinguished. A first-order direction effect can be created with two omnidirectional microphones connected electrically to each other. With an electrical connection or more than two omnidirectional microphones can directional arrangements of higher orders can also be created.

The invention relates to directional microphones comprising at least two omnidirectional microphones connected electrically to each other and which, by adjusting the delay time (s) provide the opportunity for simple alteration of the directional characteristic during operation of the directional microphone.

Directional microphones which comprise a number of omnidirectional microphones stand out from a single omnidirectional microphone not because a specific direction is especially well received, but because one (or more) direction (s) is (are) suppressed in relation to the non-directed (omnidirectional) microphone. This is illustrated graphically in what are known as polar diagrams. In these diagrams the attenuation in dB is mostly plotted for an acoustic input signal against the angle of incidence. A position with very high attenuation is referred to as a notch in such a diagram. Depending on the position and number of the notches, different detector characteristics are produced (kidney-shaped characteristic, figure-of-eight-shaped characteristic etc).

With a static directional microphone a specific directional characteristic is fixed by selecting a specific delay time or specific delay times. With a directional microphone constructed from two omnidirectional microphones, the maximum directional effect achievable with the directional microphone, expressed by the so-called directivity index (DI), is obtained when a hypercardioid characteristic is set. This means that, for a directional microphone which is subjected to diffuse sound entering it in a free field evenly from all directions, the output signal has the lowest energy or power at this setting. Static directional microphones in hearing devices are frequently adjusted to such a setting.

A static directional characteristic of a directional microphone optimized in the free field is further worsened when a directional microphone is used in a hearing device if the hearing device is worn on a user's head by the influence of the head, since the head changes both the amplitude and also the phase of the signals picked up by the microphone. This also worsens the maximum directional effect that can be achieved by the directional microphone. From a hypercardioid set in the free field with maximum DI for example another directional characteristic will arise which has its notch at another angle and will thus no longer possess an optimum DI.

Compensating for the negative influence of the head on the optimum directional effect by not optimizing the directional effect in the free field but on an artificial head created for test purposes, e.g. the KEMAR, and thereby at least reducing the negative head effects, is known. The problem now however is that the influence of the head and the pinna can be individually quite different and the improvements achieved on an average artificial head are not optimized for the relevant individual electrophysiological situations.

An adaptive directional microphone with a number of microphones electrically connected to each other is known from US 2001/0028718 A1, in which the directional effect is continuously adapted during ongoing operation of the directional microphone to different hearing situations. The known directional microphone comprises means for determining the energy of the directional microphone signal created by the directional microphone, through which interference signals from different incident directions can be suppressed very quickly in the microphone system as a result of very short adaptation times. However the adaptive directional microphone does not provide any advantage worth mentioning over a static directional microphone in situations with predominantly diffuse, i.e. non-directed interference noise (e.g. a cafeteria).

Until now directional microphones have been operated either as static directional microphones in which the delay time(s) is (are) set once and then retained, or as adaptive directional microphones which react quickly to changing environmental situations and adaptively suppress interference noise. The time constants used with adaptive directional microphones are usually less than a second.

SUMMARY OF INVENTION

The object of the present invention is to improve the directional effect of a static directional microphone during use in a natural environment.

This object is achieved by a method with the method steps in accordance with the claims. The object is further achieved by a directional microphone with the features specified in the claims.

The invention brings an improvement in the directional effect of a directional microphone operated as a static directional microphone. The intention is not to improve the effectiveness of an adaptive directional microphone which reacts immediately to short-term noise events occurring or noise sources moving in the room.

The invention thus solves the specified problem by operating a static directional microphones like an adaptive directional microphone, only with an extremely long reaction time by comparison with an adaptive directional microphone. The inventive static directional microphone can and should thus not react noticeably to interference noise sources occurring, but merely to influences which affect the directional microphone over the long term.

In this case, by setting at least one optimized delay time under real environmental conditions of the directional microphone during operation, an optimized static directional effect is automatically achieved. For this, when the directional microphone is used in accordance with invention for a hearing device worn on the head for example, instead of the average head (e.g. the KEMAR) an "average noise field" (diffuse noise field) is assumed. I.e. it is assumed that with a sufficiently long wearing time (order of magnitude of hours to days) the interference noise will fall evenly on the hearing device from all directions, which is a thoroughly realistic assumption. An existing notch can now adapt itself extremely slowly to the average noise field so that over the average long period an optimum static directional effect is formed which is adapted precisely to the relevant environmental situation of the directional microphone, for example the individual circumstances of a hearing device worn on the head with the directional microphone concerned. The range of adaptation is selected in this case so that the bandwidth of the various interference influences, e.g. the individual head influences, can be compensated for the relevant inventive use of the directional microphone.

Thus the object of the invention is not to react quickly to changing ambient conditions, e.g. to a noise source which has moved relative to the directional microphone, as occurs with an adaptive directional microphone. Instead, in the invention an optimization is to be undertaken for a directional microphone so that the settings of the static directional microphone can at least be essentially simply adapted to a long-duration influences on the directional microphone (head shape of the wearer of the hearing device, changed hairstyle of a hearing device wearer, changes in electrical characteristics of the components used for the directional microphone over its entire lifetime etc). Long-duration in this case means at least lasting for hours, if not even for days, weeks or months. Individual noise events entering the directional microphone influence the static directional microphone in accordance with the invention at most insignificantly.

To achieve this, a very long "adaptation time" for the "static" directional microphone is predetermined so that an undesired adaptation to short-term events can be excluded.

Preferably with a directional microphone in accordance with the invention, a specific directional characteristic is set a over a long period (hours, days or even weeks) so the energy or the power of the created directional microphone signal is measured and averaged, in which case this first directional microphone signal is provided as an output signal of the directional microphone for further processing. Simultaneously for a directional characteristic which has slightly changed in relation to the set directional characteristic over the said period, the energy or the power of a second directional microphone signal is determined, whereby this second directional microphone signal is not intended for further processing. If the energy or power averaged over the period for the second directional microphone signal is greater than for the first, no adaptation of the directional microphone takes place. If on the other hand the energy or power for the first directional microphone signal averaged over time is greater than for the second, the directional microphone is adapted to the extent that subsequently the slightly changed directional characteristic is set for the directional microphone of which the directional microphone signal will be further processed. To detect the average energy or power for the period observed the RMS (Root Mean Square) method can be employed for example.

To create a changed directional characteristic compared to the directional characteristic set at least one delay time of the directional microphone is to be changed. If this change has caused a reduction of the average energy or power, in the next step there is preferably a further change to the delay time by the same amount and with the same leading sign as with the first change. If on the other hand the average energy or power has increased, in the next step there is preferably a change of the delay time by the same amount but with the reversed leading sign.

The "speed of adaptation" of the "static" directional microphone is primarily influenced by two parameters. On to one hand this is the frequency with which the changes in the setting of the directional characteristic are allowed. It can be defined for example that an automatic adaptation of the directional characteristic in accordance with the invention is undertaken every hour. On the other hand this is the amount by which the delay time can be changed in each case. This amount is defined for example so that a notch present in a directional characteristic can at most be shifted in 1° steps. Preferably these parameters are pre-set for a hearing device with a corresponding directional microphone and can be modified through the programming of the hearing device. In such cases specific upper and lower limits for the parameters involved can also be defined. In this way a high level of flexibility for the adjustment of the directional microphone is achieved.

A further development of the invention makes provision for a variable "speed of adaptation". Thus for a hearing aid newly delivered to a user, a comparatively short adaptation time could first be provided in which a marked change of the directional characteristic within a few hours is possible in order to achieve an adaptation to the individual user as quickly as possible. As the length of operation increases the adaptation option is then restricted so that after some time only adaptation to long-term changes is possible. A marked change of the directional characteristic is then only possible within days or weeks. These parameters which affect the directional microphone are also preferably able to be adjusted by programming the hearing device.

In a variant of the invention a setting of the directional microphone is undertaken advantageously in accordance with the invention depending on the signal frequency of incoming noise signals. To do this the microphone signals can be split up into different frequency bands and a separate optimization of the directional microphone can be undertaken for the different frequency bands. This enables the DI to be increased even further.

An inventive directional microphone preferably includes a non-volatile memory so that the current settings and where necessary also the power and energy values determined and averaged over a longer period (hours, days, weeks) continue to be available after the directional microphone involved is switched off and switched back on. This means that the optimization is thus not affected by the switching off and switching on.

BRIEF DESCRIPTION OF THE DRAWINGS

The invention will be explained in greater detail below with reference to the figures and the associated description: The figures show:

a) FIG. 1 a first-order differential directional microphone, b) FIG. 2A to 2D directional characteristics depending on the relationship of internal to external delay $T_I/T_e$, c) FIG. 3A to C the principle of an adaptive directional microphone, d) FIG. 4 the directional characteristic of a hearing device worn on the head with a directional microphone, e) FIG. 5 a flowchart for executing a method in accordance with invention and f) FIG. 6 a block diagram of an inventive directional microphone

DETAILED DESCRIPTION OF INVENTION

Figure 1:
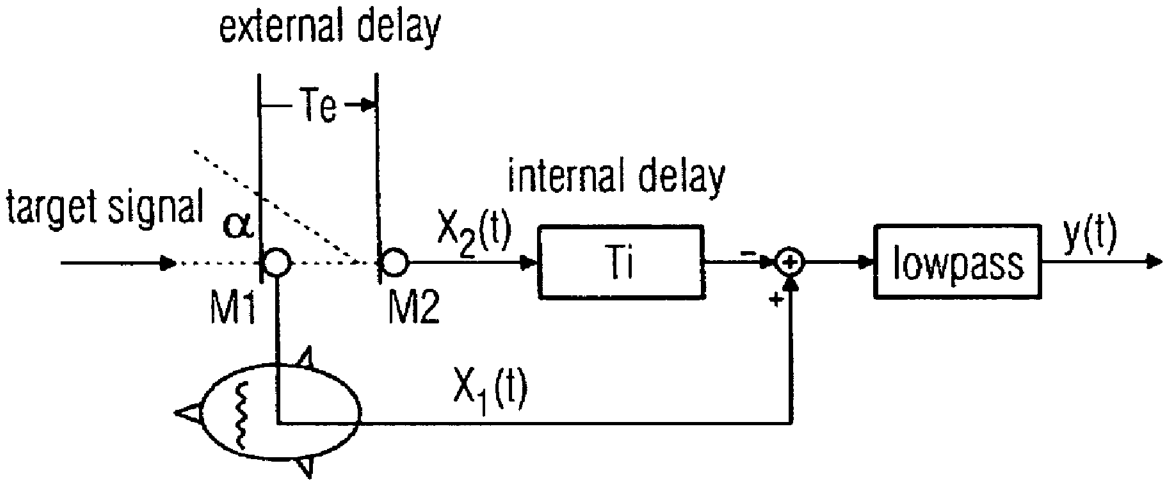
FIG 1 (prior art)

FIG. 1 shows the use of a known differential directional microphone of first order in a hearing device. Two omnidirectional microphones spaced at a distance of between 10 and 15 mm are typically used for this. The electrical connection of the microphones essentially consists of a subtraction of the rear microphone signal $X_2$ from the front microphone signal $X_1$ delayed by the time $T_I$. This produces a sensitivity dependent on direction, in the exemplary embodiment a first-order directional characteristic. As illustrated in FIGS. 2A to 2D different directional characteristics can be created by different settings of $T_I$. The strength of the directional effect is quantified by the Directivity Index (DI), which in the case of a diffuse interference noise field and a useful noise incidence from the 0° front direction produces an improvement in the Signal-to-Noise Ratio (SNR) compared to an omnidirectional characteristic.

Figure 2A:
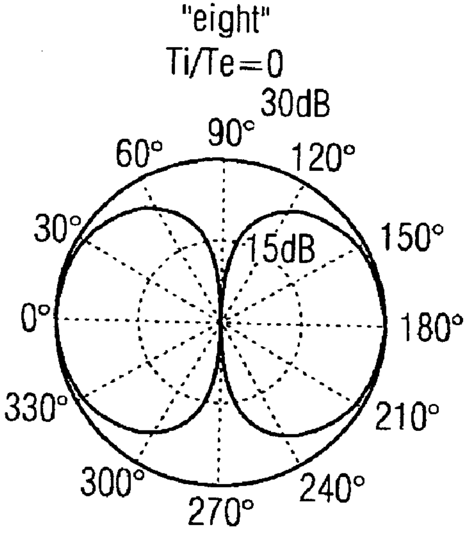
FIG 2A (prior art)
Figure 2B:
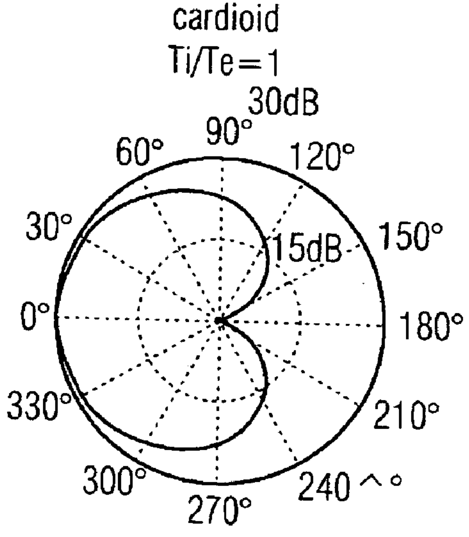
FIG 2B (prior art)
Figure 2C:
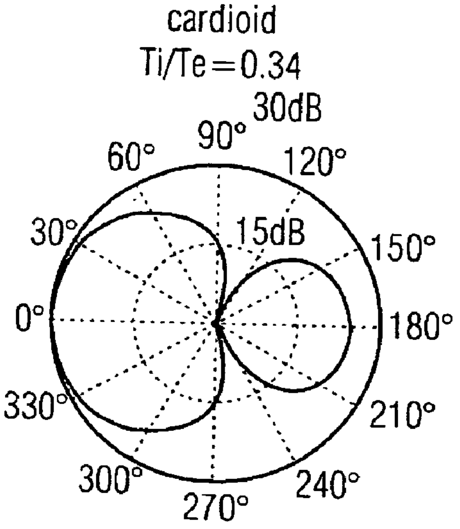
FIG 2C (prior art)
Figure 2D:
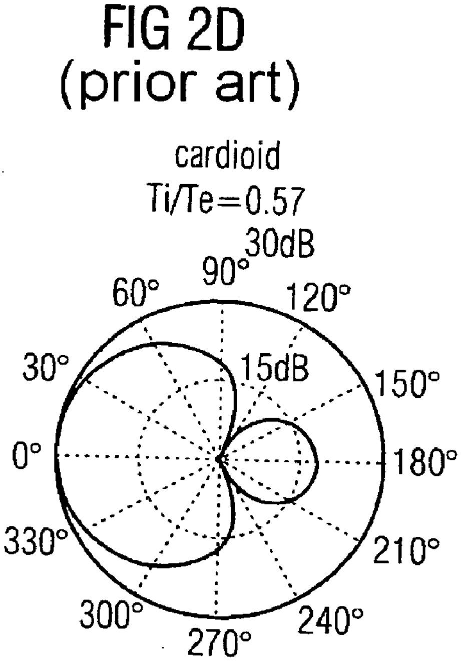
FIG 2D (prior art)

FIG. 2A shows an "eight" directional characteristic with $T_I/T_e=0$, with which a DI of 4.7 DB can be achieved. FIG. 2B shows a cardioid directional characteristic with $T_I/T_e=1$ and a DI of 4.8 dB. In FIG. 2C a hypercardioid directional characteristic for $T_I/T_e=0.34$ is illustrated, for which the maximum directivity index DI=6.0 dB for a directional microphone of the first order. Finally FIG. 2D shows a supercardioid characteristic for $T_I/T_e=0.75$ with a DI of 5.7 dB. The specified values concerned are values that can be achieved theoretically in the free field.

In practice the theoretically achievable value of DI=6 dB can however not be achieved since both the inevitable differences in the amplitude and phase curves of the microphones which are assumed to be identical and also bending and shadowing effects by the head of the hearing aid wearer have negative effects on the directional characteristic.

In a few digital hearing devices adaptive directional microphones have also been offered for some time which adapt their directional characteristic to maximize the SNR gain in hearing situations with directed interference noise incidence continuously to the actual noise field. These systems permanently estimate the angle of incidence of the dominant interference noise source and automatically set their directional characteristic, as shown in FIG. 3, by variation of $T_I$ so that the direction of lowest sensitivity of the directional microphone corresponds to the angle of incidence of the interference noise. The adaptation is undertaken by minimizing the energy or power of a directional microphone signal created by the directional microphone. Very short time constants in the range of 100 ms are selected and the directional effect is adjusted so that the transmission function for a sound signal (useful signal) arriving from the angle of view of the hearing aid wearer does not change noticeably.

Figure 3A:
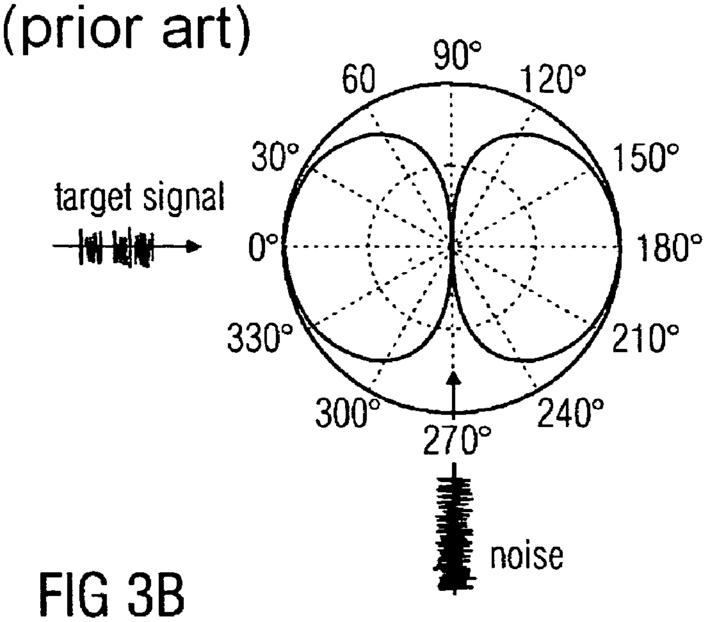
FIG 3A (prior art)
Figure 3B:
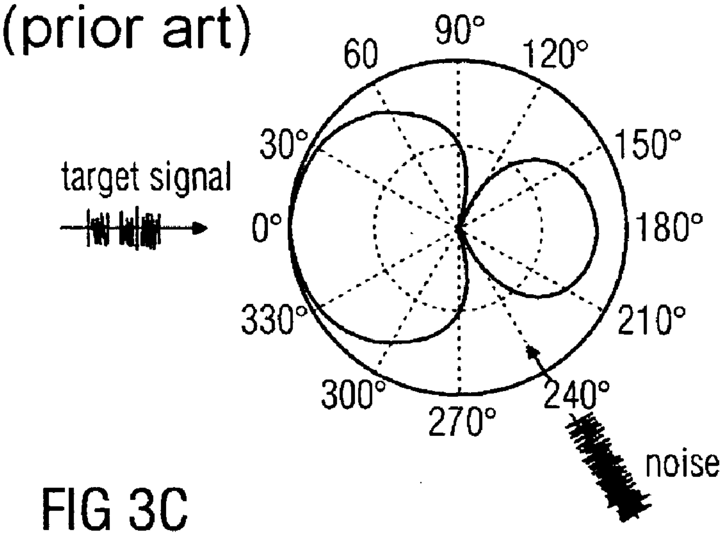
FIG 3B (prior art)
Figure 3C:
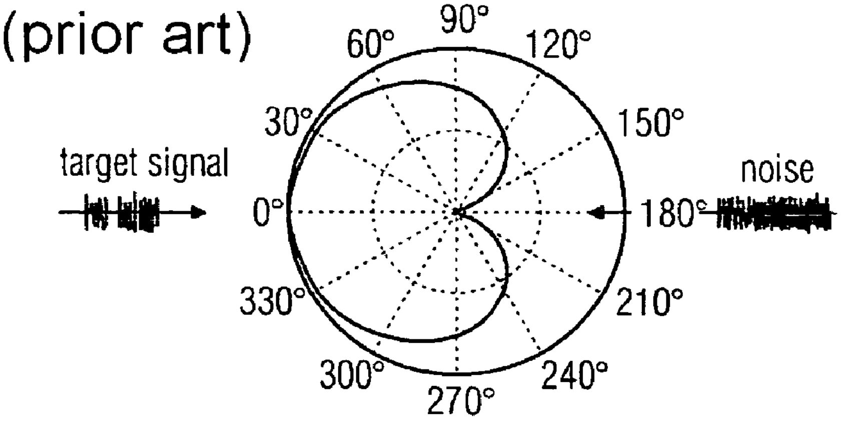
FIG 3C (prior art)

FIGS. 3A to 3C show directional characteristics for different angles of incidence of a dominant noise signal for which the notch adaptively constantly lies in the direction of incidence of the noise signal so that the noise signal is largely suppressed.

In situations with predominantly diffuse, i.e. undirected noise (e.g. cafeteria) an adaptive directional microphone does not produce any appreciable advantage over a static directional microphone. For these situations it is thus particularly important for the static direction or microphone to have the best possible directional effect close to the optimum. This is guaranteed by invention.

Figure 4:
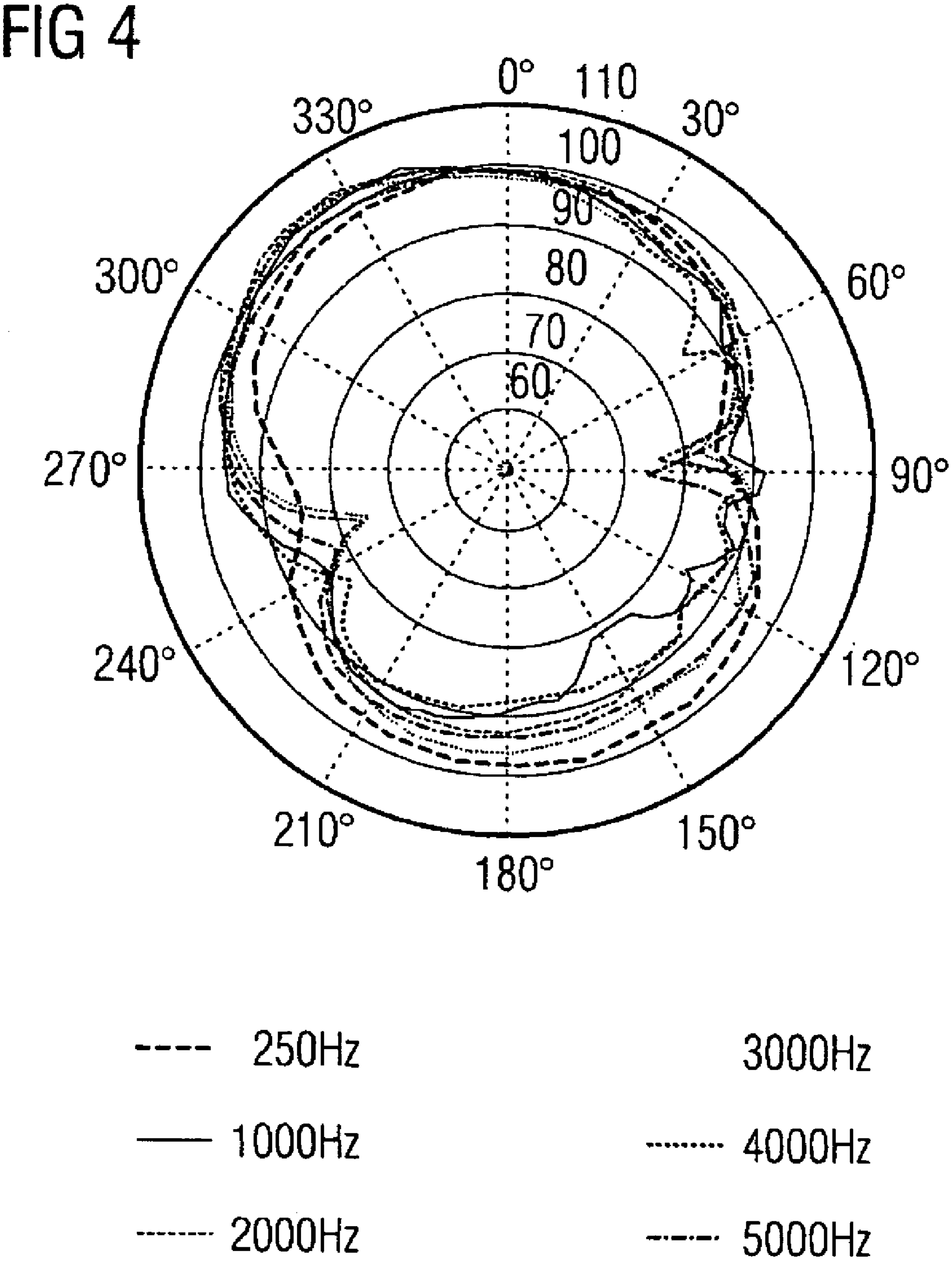

FIG. 4 illustrates the actual measured directional characteristic of the directional microphone of a first order for a hearing device worn on the left ear of a user. As a result of shadowing and phase effects a distorted directional characteristic occurs compared to the ideal directional characteristic, which, as illustrated in FIG. 4, is also strongly frequency-dependent. This means that several notch directions are formed over the frequency, which leads to a reduced directional effect.

Usually for a hearing device with a first-order directional microphone the static directional effect is optimized by measurements taken on a standardized artificial head (e.g. the KEMAR). In addition the DI is determined in a diffuse noise field for different notch directions. The setting which produces a maximum DI is then used for the static directional microphone of the hearing device concerned. Since the KEMAR only represents an "average head" other directional characteristics can express themselves on the real head of the hearing aid wearer as a result of individual anatomical circumstances and these will lead to a reduction in the directional effect. A measurement and optimization of the directional effect for each individual hearing aid wearer would be time-consuming and expensive. In addition the noise influences can change over a longer period of use, e.g. by a different position of the hearing devices on the head, changes of hairstyle, wearing a head covering etc, so that an optimization undertaken once loses its effect over time.

The invention thus provides for a static directional effect during the ongoing operation of the directional microphone, e.g. for a hearing device worn on the head of a hearing device wearer, so that changes for external influences resulting from wearing the device on the head can be taken into account and compensated for.

Figure 5:
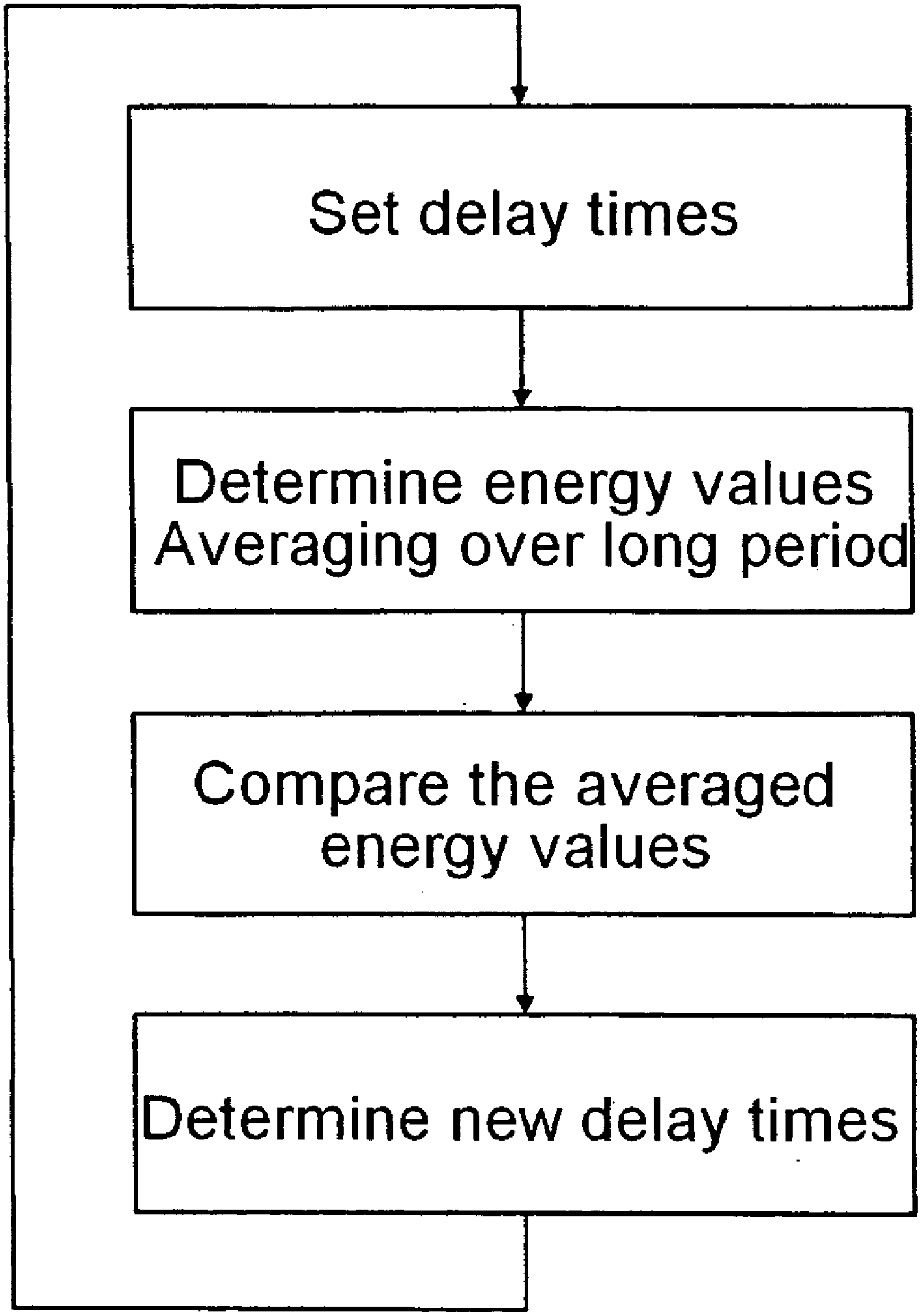

FIG. 5 initially gives a general description of the essential method steps in performing a method in accordance with invention. The flowchart applies to a particular frequency band or a directional microphone in which there is no subdivision of the acoustic input signal into frequency bands.

In a first method step two directional microphones are formed by delaying a microphone signal in parallel with two different delay times. The delay times differ slightly so that two slightly different directional characteristics result. Subsequently, for the two directional microphone signals created in this way, the energy contained in the signals is measured and averaged over a long period, e.g. over several hours. A subsequent comparison of the average energy values shows in which of the microphone signals there is a lower energy and thereby the directional microphone with the better noise signal suppression. Subsequently the delay time is set accordingly for the directional microphone of which the directional microphone signal is intended for further processing. For the other directional microphone a new delay time is determined which differs slightly from the delay time already defined. The leading sign of the difference between the already defined and the slightly different delay time stems from whether these slightly changed delay times in the previous round has produced a reduction in the averaged energy or not.

By way of illustration the invention is explained below with reference to a concrete exemplary embodiment.

Figure 6:
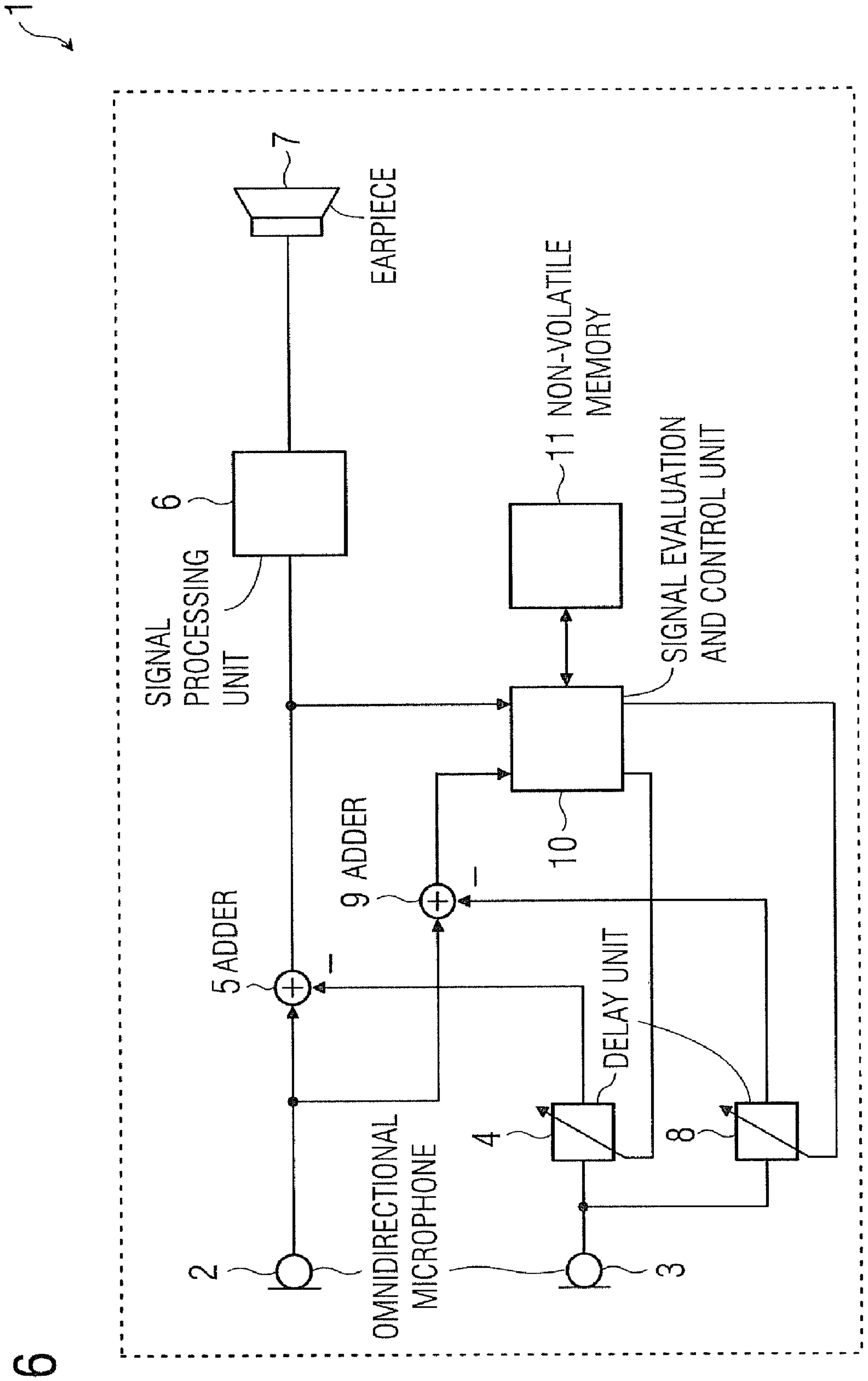

FIG. 6 shows a hearing device 1 in the simplified block diagram. The hearing device 1 comprises the two omnidirectional microphones 2 and 3 which are electrically connected to each other in order to create a directional characteristic. To this end the outgoing microphone signal from the microphone 3 is first delayed in a delay unit 4 and subsequently subtracted in an adder 5 from the microphone signal of the microphone 2. The resulting first directional microphone signal is finally fed for further processing and frequency-independent amplification to a signal processing unit 6 which delivers an electrical output signal which an earpiece 7 converts into an acoustic signal in order to direct it to the hearing of a user.

In accordance with the invention a second directional microphone signal is formed simultaneously to the first directional microphone signal. To this end the outgoing microphone signal from the microphone 3 is delayed in a second delay unit 8 and is also subtracted in an adder 9 from the microphone signal of the microphone 2. In this case the delay in the delay unit 8 differs slightly by a specific amount from the delay in the delay unit 4 so that two directional microphones with slightly different directional characteristics are present. The two directional microphone signals are finally fed to a signal evaluation and control unit 10 in which the energy of the two directional microphone signals is recorded and averaged over a long period, e.g. 24 hours. If less energy extends in the second directional microphone signal observed over this period than in the first signal this means that a higher attenuation of interference noise has occurred at the second directional microphone than at the first. Thus the delay time set in a the delay time unit 8 is subsequently set as the new delay time in the delay time unit 4. This process is controlled by the signal evaluation and control unit 10. Furthermore the time constant set in the delay unit 8 is set so that it again differs by a specific amount from the effective delay in the delay unit 4. Subsequently the process begins again, i.e. the energy values of the microphone signals are again determined weighted and finally compared to each other over a long period, in which case the delay time which has led to the smaller energy value is then set as the new delay time for the directional microphone of which the directional microphone signal will be further processed and amplified If the slight change in the delay time in the second directional microphone has not led to a reduction of the energy value determined, in the next step the delay time in the delay unit 8 is changed by the same amount in relation to the delay times set in the delay unit 4 as in the previous pass, in which case the change is now undertaken with the leading sign reversed. The directional microphone thus always runs in the direction of the energy minimum, but by contrast with an adaptive directional microphone in the conventional sense, it does it very slowly.

The specific amount by which the delays occurring in the delay units 4 and 8 differ, as well as the frequency with which an update of the directional effect is undertaken with a specific period are preferably able to be adjusted in the programming of the hearing device 1.

Especially if the averaging of the energy values is to be undertaken over a very long period, e.g. over several hours, days or weeks, it is sensible to store the last state before the hearing device was switched off so that it is possible to refer back to the state as a basis for the further determination after the device has been switched back on. To this end the hearing device 1 includes a non-volatile memory 11.

Naturally the static directional microphone in accordance with invention can from time to time, e.g. if a specific hearing program is activated, also be operated as an adaptive directional microphone. The procedure for optimizing the energy contained in the directional microphone signal is similar to that described above, with the difference that very short adaptation times are then selected, which lie in the range of 100 ms for example.

The procedure described for a first-order directional microphone can also be transferred in a similar way to directional microphones of higher orders. Furthermore the invention can also be used with directional microphones in which the microphone signals are first split up into a number of parallel frequency bands. The optimization described is then undertaken in parallel in the different frequency bands.

A directional microphone in accordance with the invention can advantageously be used in a hearing device. It is however not restricted to this use. It can advantageously also be used in many other devices, e.g. in communication devices (mobile telephones etc.) is or entertainment devices (camcorders etc).

As in the adaptation of an adaptive directional microphone for instantaneous suppression of a noise signal, the invention also provides for a minimization of the power or of the energy of a directional microphone signal created by the directional microphone. Unlike known directional microphones which operate with comparatively short time constants ranging from milliseconds up to a maximum of one second, the inventive method operates with a very long time constant. In this case it is assumed that in the daily use of the directional microphone, observed over a very long period of time, interference noise sources are produced from almost all directions. When a hearing aid with the directional microphone in accordance with invention is worn, both the movability of many sound sources and also the movability of the head contribute to this. The long-term average than contains a hearing device worn on the head in good proximity in a diffuse sound field to which the direction microphone adapts extremely slowly so that it is possible to continue to refer to it as a static directional microphone. Thus the period for the invention in which of the notch can move through a specific angular range, e.g. between 90° and 180° as fast as possible amounts to hours, days or even weeks. The invention is not intended, as with a conventional adaptive directional microphone, to allow a fast reaction to a concrete interference signal source occurring. Instead these types of interference signal sources occurring suddenly and for a short period are to be viewed as interferers in the optimization of the directional effect in accordance with the invention, which however because the duration of their occurrence, the changing direction of incidence and the frequency of their occurrence individually do not have any appreciable influence on the optimization in accordance with invention.

The period with which the notch of an inventive directional microphone can pass as quickly as possible through a predetermined angular range can be defined by a number of setting parameters. On the one hand this is the interval in time in which any change at all can occur in at least one delay time of a directional microphone in accordance with invention. Furthermore this is the step width which specifies the maximum difference between two adjacent delay times. These two parameters are tailored to each other so that the stated maximum change in the directional characteristic is produced within a specific period.

Unlike with a conventional adaptive microphone, with the invention at least one significant delay time for the directional characteristic is stored in a non-volatile memory so that after the directional microphone is switched off and switched back on again, for example as a result of a corresponding switching on and switching off of the hearing device with the directional microphone concerned, the last valid value of this delay time continues to be used as the starting value after the device is switched back on. This measure makes sense as a result of the extremely slow speed of adaptation. If no such value is present when the directional microphone is switched on, for example when a hearing device is first put into service by the user, a default value is used which is based for example on a measurement at the KEMAR.

With the directional microphone in accordance with the invention the gaps in time between consecutive changes to the delay time as well as the maximum step width for the change of the delay time can be set by programming the directional microphone. This allows the speed of adaptation to be defined in advance.

The invention claimed is:

1. A method for adjusting a directional microphone of a hearing device, comprising:

electrically connecting at least two omnidirectional microphones to each other;

each of said at least two omnidirectional microphones generating respective first and second microphone signals;

delaying the second generated microphone signal by a first delay time imparted by a first delay unit to generate a first delay signal;

processing the first generated microphone signal by combining with the first delay signal to generate a first electrical output signal, which is converted to an acoustic signal supplied to a wearer of the hearing device;

delaying the second generated microphone signal by a second delay time imparted by a second delay unit to generate a second delay signal, the second delay time having a value different than a value of the first delay time;

processing the first generated microphone signal by combining with the second delay signal to generate a second electrical output signal;

recording respective electrical powers of the first and second electrical output signals over an extended time period, the extended time period being at least several hours;

determining which of the first and second electrical output signals contains a lower amount of power;

if the second electrical output signal contains a lower amount of power than the first electrical output signal, replacing the value of the first delay time in the first delay unit with the value of the second delay time;

further replacing the value of the second delay time in the second delay unit with a third delay time having a value and/or polarity different than the respective values and/or polarities of the first and second delay times;

iteratively performing over a further period of time the recording, the determining and the replacing for minimizing an amount of power in the first electrical output signal, which is converted to the acoustic signal supplied to the wearer of the hearing device.

2. The method for adjusting a directional microphone as claimed in claim 1, wherein the respective electrical powers are averaged over the extended time period.

3. The method for adjusting a directional microphone as claimed in claim 1, wherein an influence of the directional microphone being affected by the minimizing comprises shadowing effects caused by a specific use of the directional microphone.

4. The method for adjusting a directional microphone as claimed in claim 1, wherein an influence of the directional microphone being affected by the minimizing comprises changes of electrical characteristics of electrical components used in the directional microphone.

5. The method for adjusting a directional microphone as claimed in claim 1, wherein the minimizing comprises setting a parameter, which determines a length of the extended time period.

6. The method for adjusting a directional microphone as claimed in claim 1, wherein the minimizing comprises setting a parameter, which specifies a maximum step width with which the directional microphone is changed within the extended time period.

7. The method for adjusting a directional microphone as claimed in claim 6, wherein the minimizing comprises setting a parameter, which specifies a difference between two consecutive adjustable delay times.

8. The method for adjusting a directional microphone as claimed in claim 1, wherein respective last values set for the first and second delay times are stored automatically when the directional microphone is switched off, and the stored first and second delay times are set as respective current values of the first and second delay times after the directional microphone is switched back on.

9. The method for adjusting a directional microphone as claimed in claim 1, wherein the minimizing comprises setting a parameter by programming the directional microphone.

10. The method for adjusting a directional microphone as claimed in claim 1, wherein the respective first and second microphone signals are divided up into a number of different frequency bands and the respective delay times are set differently in different frequency bands.

11. The method for adjusting a directional microphone as claimed in claim 1, wherein the minimizing comprises setting a parameter, which setting depends on a time for which the directional microphone has been in operation such that, as the operation time increases, a value by which the parameter changes within a specific period of time is reduced.

12. The method for adjusting a directional microphone as claimed in claim 1, wherein the minimizing comprises setting a parameter, which specifies a frequency for performing the iteratively controlling.

13. A directional microphone, comprising:

at least two omnidirectional microphones electrically connected to each other;

respective first and second microphone signals generated by said at least two omnidirectional microphones;

a first delay unit configured to impart a first delay time to the second microphone signal to generate a first delay signal;

a signal processor configured to process the first generated microphone signal by combining with the first delay signal to generate a first electrical output signal, which is converted to an acoustic signal supplied to a wearer of the hearing device;

a second delay unit configured to impart a second delay time to the second microphone signal to generate a second delay signal, the second delay time having a value different than a value of the first delay time;

a second processor configured to process the first generated microphone signal by combining with the second delay signal to generate a second electrical output signal;

a recorder configured to record respective electrical powers of the first and second electrical output signals over an extended time period, the extended time period being at least several hours;

an evaluator configured to determine which of the first and second electrical output signals contains a lower amount of power, wherein if the second electrical output signal contains a lower amount of power than the first electrical output signal, the value of the first delay time in the first delay unit is replaced with the value of the second delay time, wherein the value of the second delay time in the second delay unit is replaced with a third delay time having a value and/or polarity different than the respective values and/or polarities of the first and second delay times, wherein the recorder and evaluator are iteratively controlled over a further period of time to minimize an amount of power in the first electrical output signal, which is converted to the acoustic signal supplied to the wearer of the hearing device.

14. The directional microphone as claimed in claim 13, wherein respective last values set for the first and second delay times before the microphone is switched off are stored in a non-volatile memory and automatically set as respective current delay time values after the directional microphone is switched off and then switched back on again.

15. The directional microphone as claimed in claim 14, wherein the first and second microphone signals are divided up into a number of different frequency bands and the delay time is set differently in different frequency bands.

* * * * *